(12) United States Patent
Hyuga et al.

(10) Patent No.: US 8,695,211 B2
(45) Date of Patent: Apr. 15, 2014

(54) MANUFACTURING METHOD OF PUSH-BUTTON SWITCH

(75) Inventors: Shunta Hyuga, Saitama (JP); Norio Suzuki, Saitama (JP); Keiichi Fukuda, Osaka (JP); Haruaki Miyamura, Osaka (JP)

(73) Assignee: Shin-Etsu Polymer Co., Ltd., Tokyo (JP)

( * ) Notice: Subject to any disclaimer, the term of this patent is extended or adjusted under 35 U.S.C. 154(b) by 148 days.

(21) Appl. No.: 13/508,989

(22) PCT Filed: Jul. 21, 2011

(86) PCT No.: PCT/JP2011/004108
§ 371 (c)(1),
(2), (4) Date: May 9, 2012

(87) PCT Pub. No.: WO2012/011282
PCT Pub. Date: Jan. 26, 2012

(65) Prior Publication Data
US 2012/0227251 A1    Sep. 13, 2012

(30) Foreign Application Priority Data
Jul. 23, 2010   (JP) .................................. 2010-165763

(51) Int. Cl.
*H01H 11/00*    (2006.01)
*H01H 65/00*    (2006.01)

(52) U.S. Cl.
USPC ........................................... 29/622; 29/527.1

(58) Field of Classification Search
USPC ................. 29/622, 527.1; 200/310, 341, 520; 368/319, 321
See application file for complete search history.

(56) References Cited

U.S. PATENT DOCUMENTS

| 5,043,958 A * | 8/1991 | Kaelin ........................... 368/321 |
| 6,872,899 B2 * | 3/2005 | Oshio et al. ................. 200/43.13 |
| 2003/0174590 A1 | 9/2003 | Arikawa et al. |
| 2012/0325637 A1 * | 12/2012 | Kikuchi ........................ 200/520 |

FOREIGN PATENT DOCUMENTS

| EP | 1345095 A2 | 9/2003 |
| JP | 2002-352662 A | 12/2002 |
| JP | 2004-273208 A | 9/2004 |

OTHER PUBLICATIONS

PCT International Search Report for PCT/JP2011/004108 dated Oct. 4, 2011.

* cited by examiner

*Primary Examiner* — Thiem Phan
(74) *Attorney, Agent, or Firm* — Nixon Peabody LLP; Joseph Bach, Esq.

(57) ABSTRACT

In a push-button switch manufacturing method, a key-top end of a pressing element is inserted into a lower-mold recess. A reinforcing plate is placed in the lower mold so that the pressing element extends through a plate through hole of the reinforcing plate. An upper mold and the lower mold are moved toward each other so as to insert the other end of the pressing element into an upper-mold recess for the pressing element, which is provided in a lower surface of the upper mold. A liquid silicone rubber, which contains a component that does not adhere to the upper and lower molds but adheres to the pressing element, is introduced into a cavity, the upper and lower molds are opened to remove a molded product in which an intermediate portion in an axial direction of the pressing element is supported in the plate through hole by the silicone rubber.

9 Claims, 14 Drawing Sheets

FIG.7
(a)
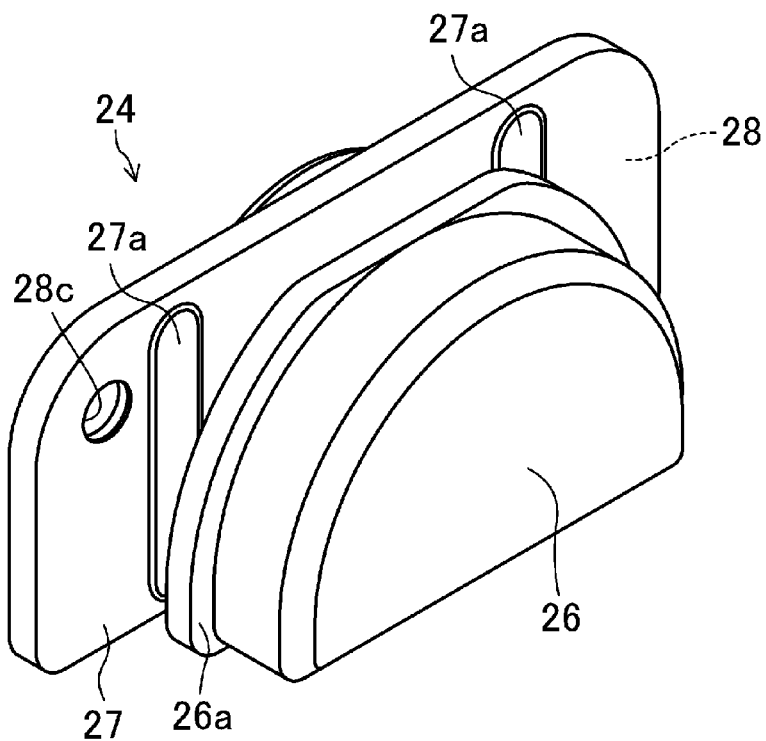
(b)
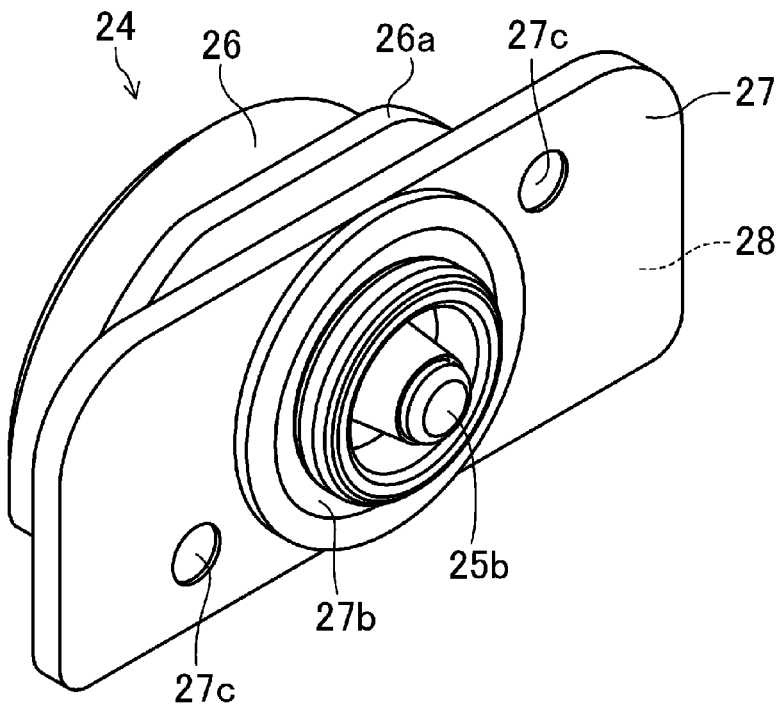

FIG.8
(a)
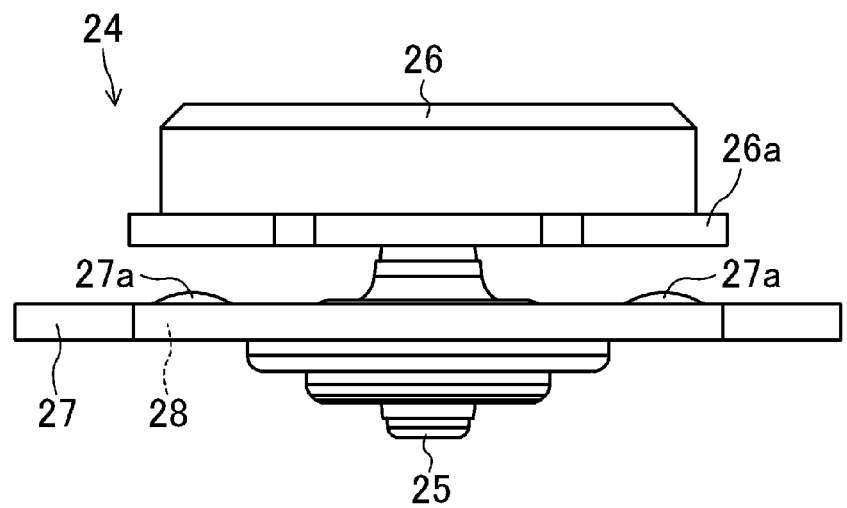
(b)
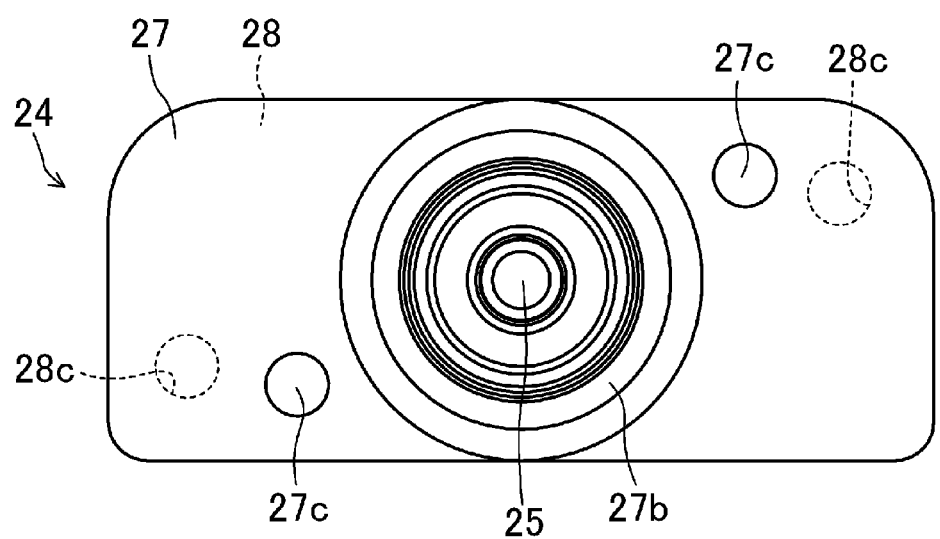

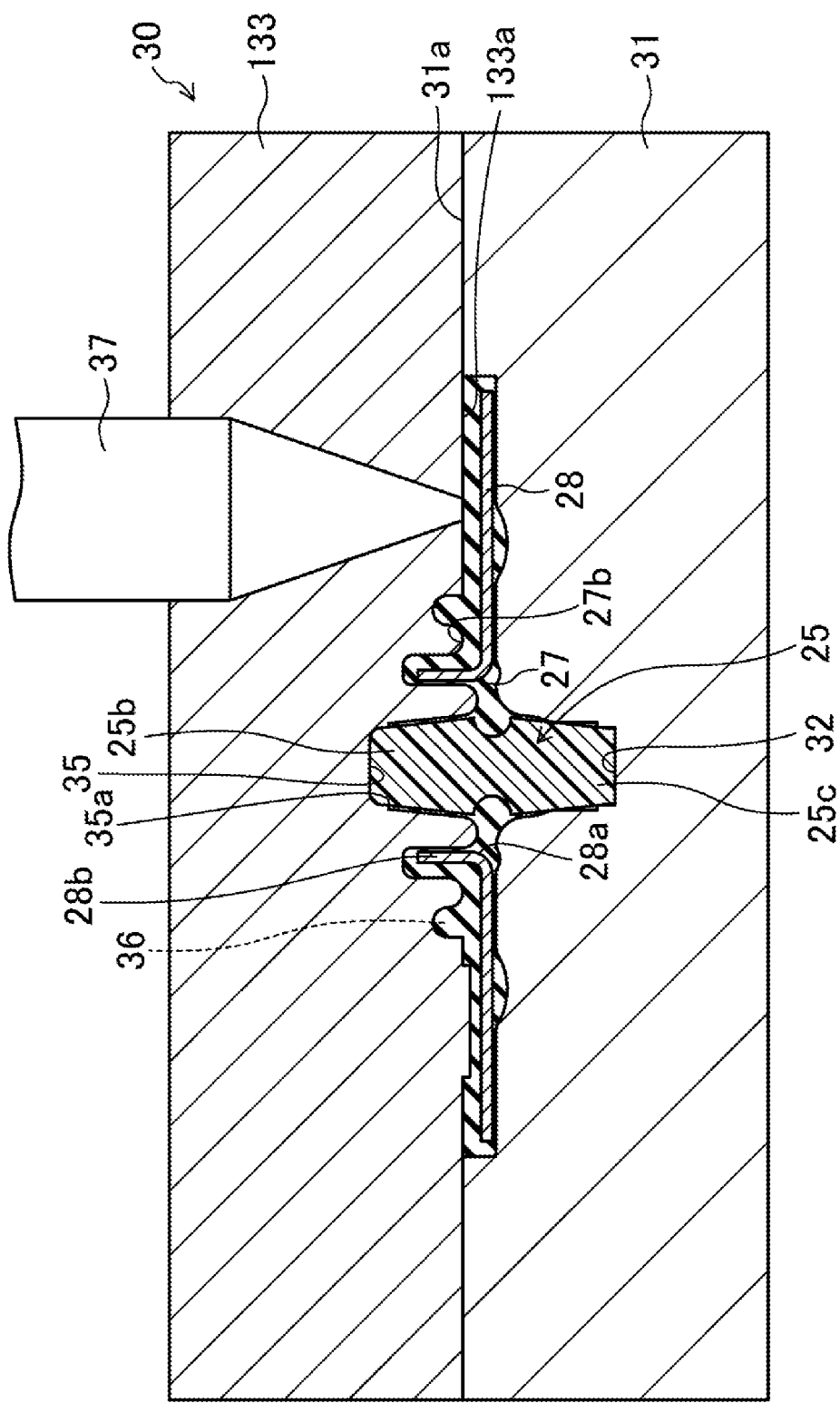

MANUFACTURING METHOD OF PUSH-BUTTON SWITCH

CROSS-REFERENCE TO RELATED APPLICATIONS

This application is a National Phase of International Application No. PCT/JP2011/004108, which was filed on Jul. 21, 2011, and which claims priority to and the benefit of Japanese Patent Application No. 2010-165763, filed on Jul. 23, 2010, and the disclosures of which are hereby incorporated herein by reference in their entireties.

TECHNICAL FIELD

The present invention relates to manufacturing methods of a push-button switch used in electronic devices such as a mobile phone.

BACKGROUND ART

Conventionally, electronic devices having a waterproof structure, such as a watch and a mobile phone, are used. For example, a push-button switch of an electronic device having a waterproof structure as in Patent Document 1 has a fixed structure portion, and an operation body attached to the fixed structure portion so as to be able to advance and retract with respect to the fixed structure portion. The operation body is provided with a sliding portion configured to be slidable with respect to the fixed structure portion, and an operation head connected to the outside of the sliding portion, shaped to overhang the sliding portion, and having a larger diameter than the sliding portion. An elastic member capable of being elastically deformed is held between the overhang portion of the operation head and the fixed structure portion. The elastic member has a cylindrical shape surrounding the sliding portion. The elastic member has a first contact portion that is in contact with the inner surface of the overhang portion of the operation head, a second contact portion that is in contact with a portion facing the overhang portion in the fixed structure portion, and a third contact portion that is in contact with the sliding portion.

SUMMARY OF THE INVENTION

Technical Problem

However, assembly of the push-button switch of Patent Document 1 is not easy because the elastic member and the operation body are separate members. Moreover, the thickness of the elastic member need be reduced in order to ensure usability of the operation body. If the thickness of the elastic member is reduced, the elastic member is extensively compressed every time the operation body is operated. Thus, the elastic member tends to be degraded, and in some cases, is fractured, resulting in degradation in waterproof performance.

As a solution to this problem, the elastic member can be provided with a reinforcing plate. However, if the reinforcing plate and the operation body (a pressing element) are comprised of different materials, it is often difficult to integrally mold the reinforcing plate and the operation body without degrading usability.

The present invention was developed in view of the above problems, and it is an object of the present invention to easily and reliably integrally mold a pressing element and a reinforcing plate by using an elastic member, and to improve durability of a push-button switch without degrading usability of the push-button switch.

Solution to the Problem

In order to achieve the above object, in the present invention, a pressing element and a reinforcing plate are integrally molded by using an elastic member containing a component that does not adhere to upper and lower molds but adheres to the pressing element, and an intermediate portion of the pressing element is supported in a through hole of the reinforcing plate.

Specifically, a manufacturing method of a push-button switch according to a first invention includes: a preparation step of preparing a key top, a pressing element that is attached to a back surface of the key top, and a reinforcing plate having a plate through hole that is larger than an outer periphery of the pressing element; a pressing-element insertion step of inserting one end in an axial direction of the pressing element into a lower-mold recess for the pressing element, which is provided in a surface of a lower mold; a reinforcing plate placing step of placing the reinforcing plate in the lower mold so that the pressing element extends through the plate through hole of the reinforcing plate; a mold clamping step of moving an upper mold and the lower mold toward each other so as to insert the other end of the pressing element into an upper-mold recess for the pressing element, which is provided in a lower surface of the upper mold; an introducing step of introducing an elastic member, which contains a component that does not adhere to the upper and lower molds but adheres to the pressing element, into a cavity formed between the upper and lower molds; a molding step of, after the introducing step, pressing and holding the upper and lower molds at a predetermined temperature for a predetermined time, and then opening the upper and lower molds to remove a molded product in which an intermediate portion in the axial direction of the pressing element is supported in the plate through hole by the elastic member; and an attaching step of attaching the back surface of the key top to the one end of the pressing element in the molded product.

With the above configuration, with the pressing element being inserted in the lower mold, the reinforcing plate is placed on the lower mold so that the pressing element extends through the plate through hole. The elastic member, which contains the component that does not adhere to the upper and lower molds but adheres to the pressing element, is introduced into the cavity formed by the upper and lower molds with the pressing element therebetween. This allows the pressing element to reliably adhere to the elastic member while maintaining a mold releasing property, and allows the pressing element to be accurately bonded to the plate through hole of the reinforcing plate via the elastic member. The push-button switch is easily manufactured by attaching the key top to this pressing element. Moreover, since the intermediate portion of the pressing element is accurately bonded to the plate through hole of the reinforcing plate via the elastic member, the elastic member is not compressed but is bent when the pressing element is operated. Thus, usability is less likely to be degraded even if the thickness of the elastic member is increased. Accordingly, durability can be improved while ensuring the usability.

According to a second invention, in the first invention, the reinforcing plate is comprised of a metal, and has been subjected to a nitriding treatment.

With the above configuration, performing the nitriding treatment on the reinforcing plate forms a nitride coating film on the surface of the reinforcing plate, which improves strength of the reinforcing plate. This treatment also chemically stabilizes the reinforcing plate, and increases corrosion resistance of the reinforcing plate.

According to a third invention, in the second invention, the reinforcing plate has been subjected to a primer treatment that increases adhesion between a surface of the reinforcing plate after the nitriding treatment and the elastic member.

With the above configuration, performing the primer treatment on the surface of the reinforcing plate after the nitriding treatment allows the reinforcing plate to be more reliably bonded to the elastic member, whereby durability of the push-button switch is further improved.

According to a fourth invention, in any one of the first to third inventions, the pressing element is comprised of a thermoplastic resin, and in the molding step, molding is performed at a temperature that is not high enough to melt the pressing element.

With the above configuration, since the elastic member is molded at the temperature that is not high enough to melt the pressing element, the pressing element, together with the reinforcing plate, is molded integrally with the elastic member without causing thermal deformation of the pressing element.

According to a fifth invention, in any one of the first to fourth inventions, the pressing element is comprised of polycarbonate, and the elastic member is comprised of silicone rubber that chemically bonds with the polycarbonate in the molding step.

With the above configuration, molding the pressing element from the polycarbonate reduces the possibility of damage to a terminal that is pressed by the pressing element, as compared to the case where the pressing element is molded from a metal. Moreover, since the elastic member reliably chemically bonds with the polycarbonate, a waterproof property and durability are ensured, and the molded product can be easily removed from the mold.

According to a sixth invention, in any one of the first to fifth inventions, the one end and the other end of the pressing element have a circular cross section, and are tapered so that an outer diameter of each of the ends is gradually reduced toward outside, at least one of the lower-mold recess for the pressing element and the upper-mold recess for the pressing element has a circular cross section, and is recessed so that its inner diameter decreases stepwise at two or more positions, and the outer periphery of the pressing element contacts each of a plurality of corners where the inner diameter decreases stepwise, and prevents the elastic member from flowing onto the outer periphery of the pressing element.

With the above configuration, the outer periphery of the pressing element is reliably retained by the plurality of corners, which are formed in the lower-mold recess for the pressing element or the upper-mold recess for the pressing element and whose inner diameters decrease stepwise. Thus, the pressing element is not tilted in the mold. This improves dimension accuracy, and ensures the usability. Moreover, since the corners eliminate the gap between the mold and the outer periphery of the pressing element, no elastic member flows onto the outer periphery of the pressing element, and no thin coating film is formed thereon. Thus, no unwanted burr is produced. This reduces the need for a deburring treatment, and no burr obstructs attachment of the key top to the one end of the pressing element.

According to a seventh invention, in any one of the first to sixth inventions, a surface roughening treatment is performed before the molding step on a portion of the pressing element, to which the elastic member is to adhere.

With the above configuration, the surface roughening treatment is performed on the portion of the pressing element, to which the elastic member is to adhere. This increases the contact area of the elastic member, and allows the elastic member to be more reliably bonded to the pressing element.

According to an eighth invention, in any one of the first to seventh inventions, the pressing element is heat-treated before the molding step at a temperature equal to or higher than the predetermined temperature of the molding step.

With the above configuration, the pressing element is heat-treated in advance at a temperature equal to or higher than the mold temperature of the molding step. Thus, even if heating is performed during the molding, deformation is less likely to occur, and the dimensions after the molding are stabilized. Accordingly, a high quality push-button switch having high usability is obtained.

According to a ninth invention, in any one of the first to eighth inventions, a constant distance is maintained between an upper surface of the reinforcing plate and the lower surface of the upper mold by at least a pair of retaining pins, which are provided on the lower surface of the upper mold to retain the reinforcing plate.

With the above configuration, the reinforcing plate is held by the retaining pins provided on the lower surface of the upper mold, so that the reinforcing plate is not tilted. This allows the pressing element to be accurately placed in the plate through hole, and allows the elastic member to have a constant thickness, whereby the push-button switch having high dimension accuracy and high usability can be obtained.

Advantages of the Invention

As described above, according to the present invention, a pressing element and a reinforcing plate are integrally molded by using an elastic member containing a component that does not adhere to upper and lower molds but adheres to the pressing element, and an intermediate portion of the pressing element is bonded to a plate through hole of the reinforcing plate. Thus, a push-button switch can be easily and reliably integrally molded, and durability of the push-button switch can be improved while ensuring usability thereof.

BRIEF DESCRIPTION OF THE DRAWINGS

FIGS. 7A-7B are enlarged perspective views of a switch assembly, as viewed from the side of a key top and from the side of silicone rubber, respectively.

FIG. 8A is an enlarged side view of the switch assembly, and FIG. 8B is an enlarged bottom view of the switch assembly.

FIG. 16 is a diagram corresponding to FIG. 10, showing a mold having no intermediate plate according to another embodiment.

DESCRIPTION OF EMBODIMENTS

Embodiments of the present invention will be described below with reference to the accompanying drawings.

Figure 2:
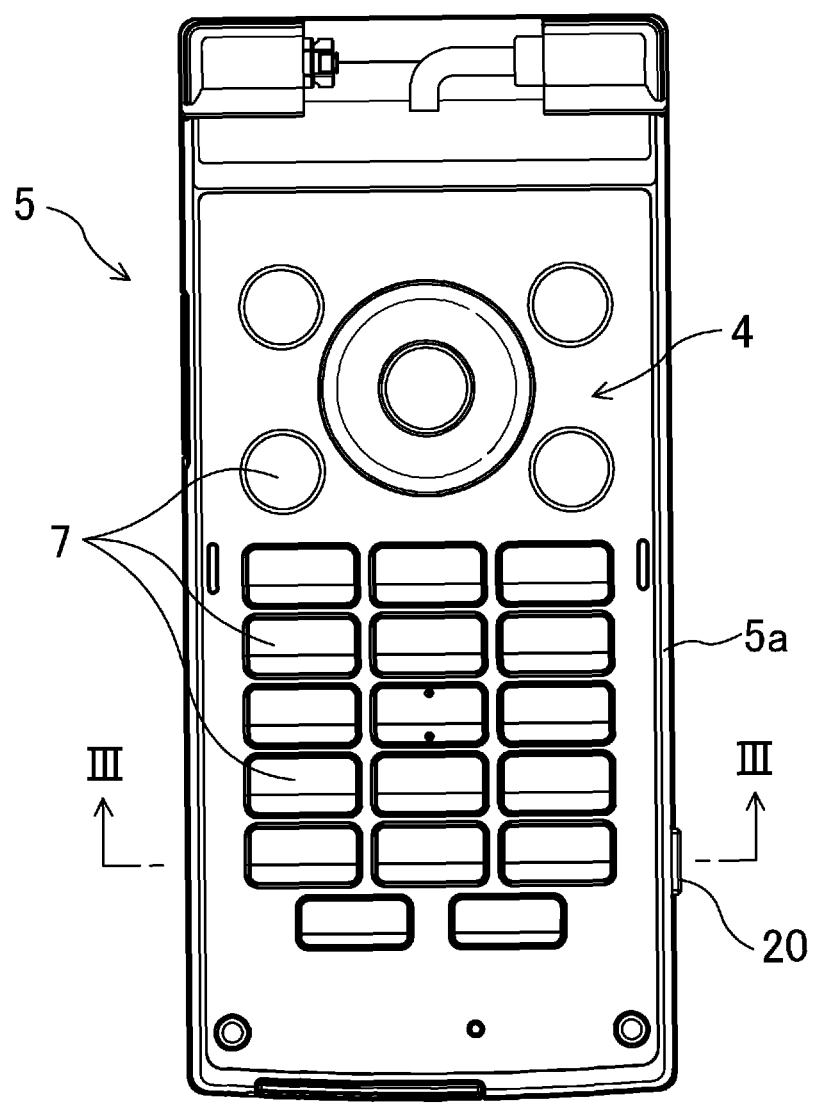
FIG. 2 is a front view of a lower housing.

FIG. 2 shows a lower housing 5 of a mobile phone including a push-button switch according to an embodiment of the present invention. The lower housing 5 has an operation portion 4 on the front side. The operation portion 4 includes a plurality of operation keys 7 such as numeric keys and function keys. In addition to the operation keys 7, a side key 20 is provided on a side surface of the lower housing 5.

Figure 3:
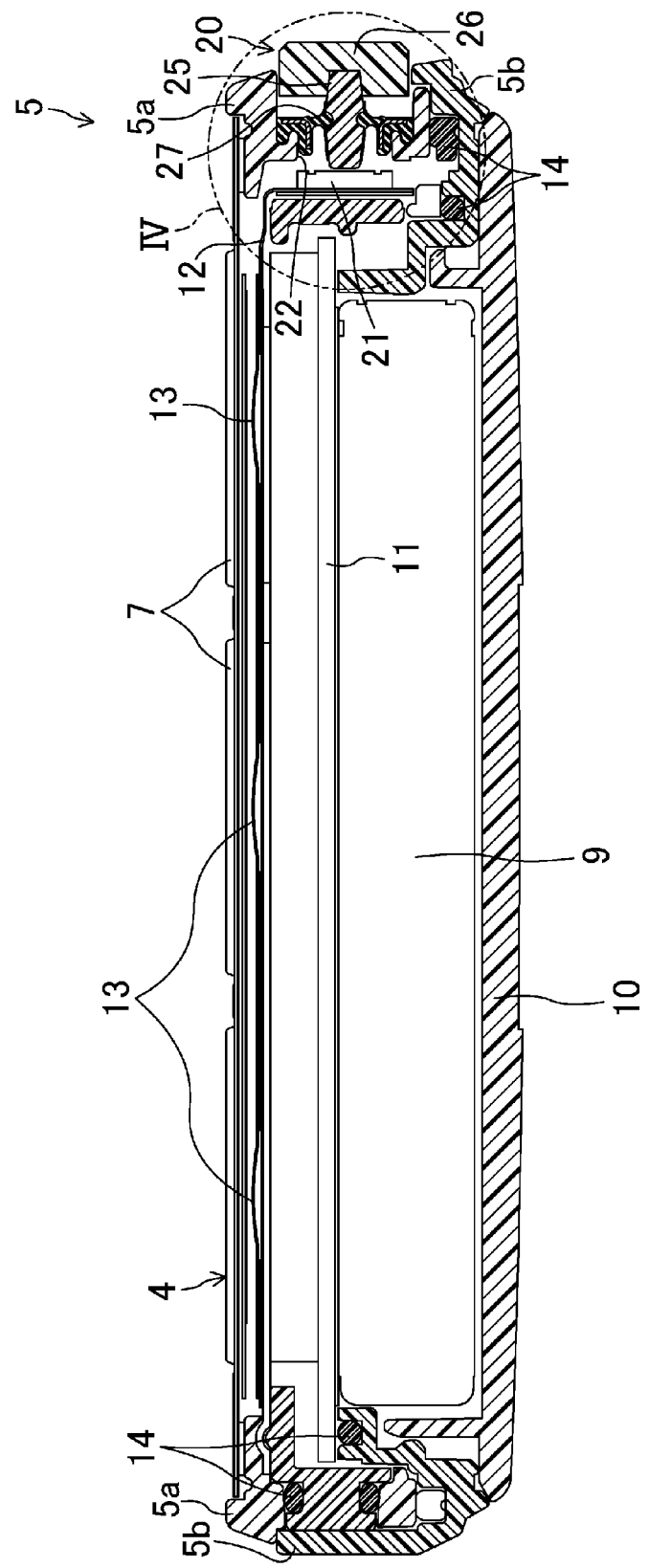
FIG. 3 is a cross-sectional view taken along line III-III in FIG. 2.

As shown in FIG. 3, the lower housing 5 includes a front cabinet 5a and a rear cabinet 5b. The rear cabinet 5b covers the rear side of the front cabinet 5a, contains a rechargeable battery 9, and is provided with a battery cover 10 that covers the rechargeable battery 9. The front cabinet 5a and the rear cabinet 5b are provided with a main substrate 11 forming the operation portion 4, and a flexible substrate 12 covering the front side of the main substrate 11. A plurality of dome-shaped switches 13 are provided on the flexible substrate 12, and the operation keys 7 are exposed from the front cabinet 5a so as to correspond to the dome-shaped switches 13. Since the mobile phone of the present embodiment has a waterproof function, a plurality of waterproof seal members 14 are provided in the lower casing 5.

Figure 4:
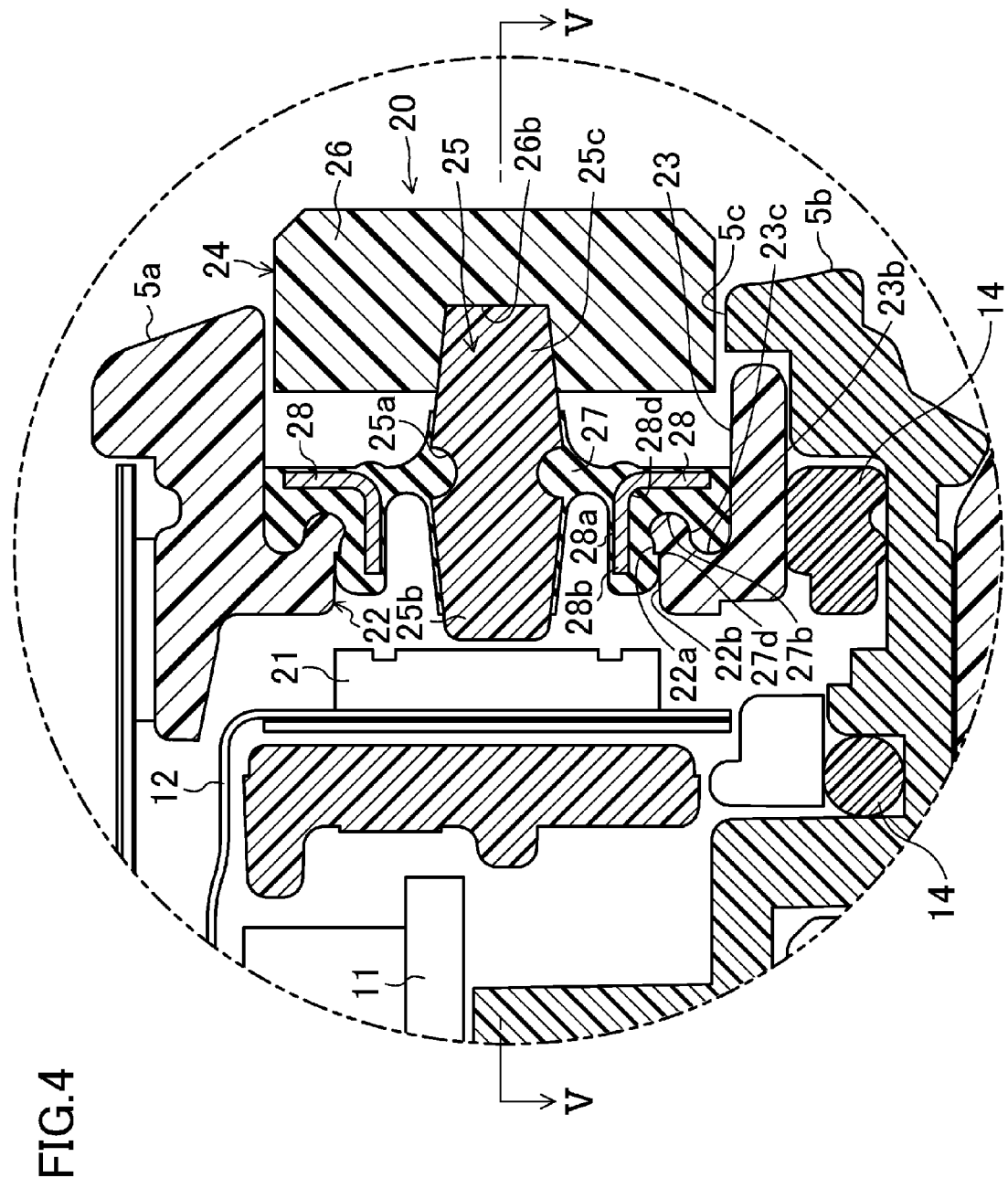
FIG. 4 is an enlarged cross-sectional view of a portion IV in FIG. 3.
Figure 5:
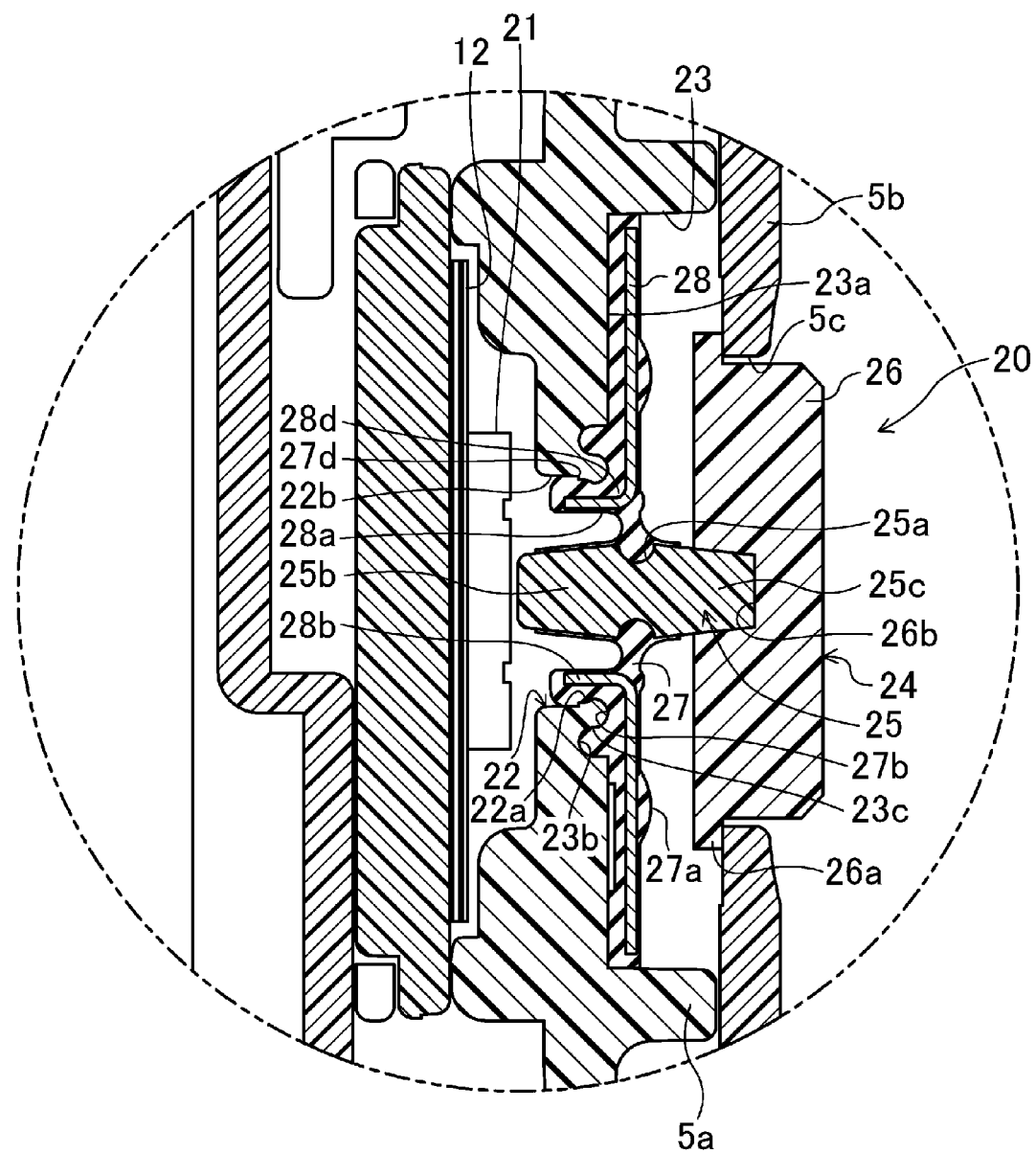
FIG. 5 is a cross-sectional view taken along line V-V in FIG. 4.
Figure 6:
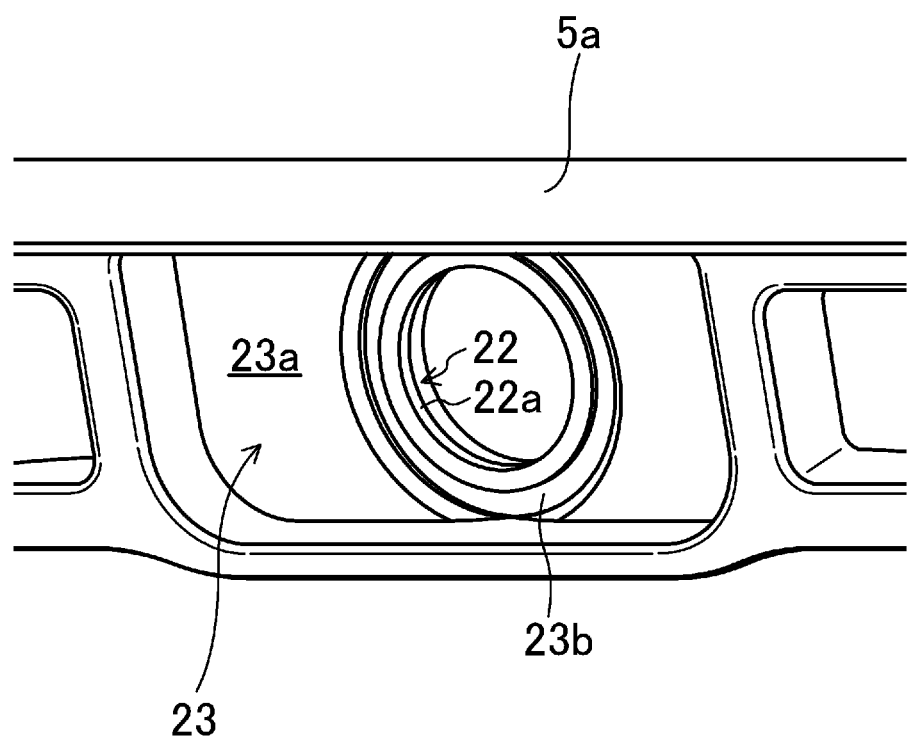
FIG. 6 is an enlarged perspective view of a switch through hole and a region around the switch through hole.

As shown in enlarged views of FIGS. 4-5, the side key 20 includes a press switch 21 electrically connected to the flexible substrate 12. The press switch 21 is designed so as to be turned on when the central portion of the surface of the press switch 21 is pressed, and to be turned off when the central portion of the surface of the press switch 21 is not pressed. As shown in FIG. 6 as well, the front cabinet 5a has a circular switch through hole 22 formed so as to face the press switch 21. The peripheral region of the switch through hole 22 is lower than the remaining region of a side surface of the front cabinet 5a, forming a switch recess 23 with a bottom surface 23a having a substantially rectangular shape as viewed from the side surface of the lower casing 5. The switch through hole 22 is located substantially in the center of the switch recess 23. A switch assembly 24 as a push-button switch forming the side key 20 is fitted in the switch recess 23.

As shown in FIGS. 7A-9 as well, the switch assembly 24 includes a pressing element 25 that presses the press switch 21 by a pressing end 25b located at one end (on the left side in FIG. 2) in the axial direction of the pressing element 25. The pressing element 25 is comprised of, e.g., bar-shaped polycarbonate (PC) having a circular cross section, and is tapered from its intermediate position in the axial direction toward both ends. The outer periphery of the tip end of the pressing end 25b is rounded. The pressing element 25 may be molded by using a thermoplastic resin other than the polycarbonate. It is desirable to mold the pressing element 25 by using the thermoplastic resin because such a press switch 21 is less likely to be damaged than the pressing element 25 that is molded by using a metal. A bonding recess 25a having an arc-shaped cross section is formed in the outer periphery of an intermediate portion in the axial direction of the pressing element 25. A key top 26 is coupled to a key-top end 25c located at the other end in the axial direction of the pressing element 25, by bonding etc. The key top 26 is comprised of, e.g., an aluminum alloy. As shown in FIGS. 4-5, the side surface of the front cabinet 5a, which is located on the side of the battery cover 10, is covered by the rear cabinet 5b, and the rear cabinet 5b has an external fitting through hole 5c at a position corresponding to the switch through hole 22. In order to improve usability while reducing the thickness of the lower housing 5, the outer surface (the surface viewed from the side surface of the lower housing 5) of the key top 26 is formed in a semicircular shape, and a flange 26a is formed in the periphery of the key top 26. With the key-top end 25c being fitted in a pressing-element fitting recess 26b formed in the back surface of the key top 26, the flange 26a contacts the back surface of the rear cabinet 5b in the periphery of the external fitting through hole 5c when the side surface of the front cabinet 5a is covered by the rear cabinet 5b. This prevents the key top 26 from being removed from the lower housing 5, and improves appearance because only the portion of the key top 26, which is located outside the flange 26a, is exposed from the lower housing 5.

Silicone rubber 27 as an elastic member is placed in the bonding recess 25a of the pressing element 25 by integral molding. The silicone rubber 27 has a substantially rectangular shape corresponding to the switch recess 23, as viewed in plan, and a reinforcing plate 28 comprised of a stainless steel alloy (e.g., SUS 304) is embedded in the silicone rubber 27. The reinforcing plate 28 is a plate-like member having a substantially rectangular shape as viewed in plan, corresponding to the shape of the switch recess 23.

Figure 9:
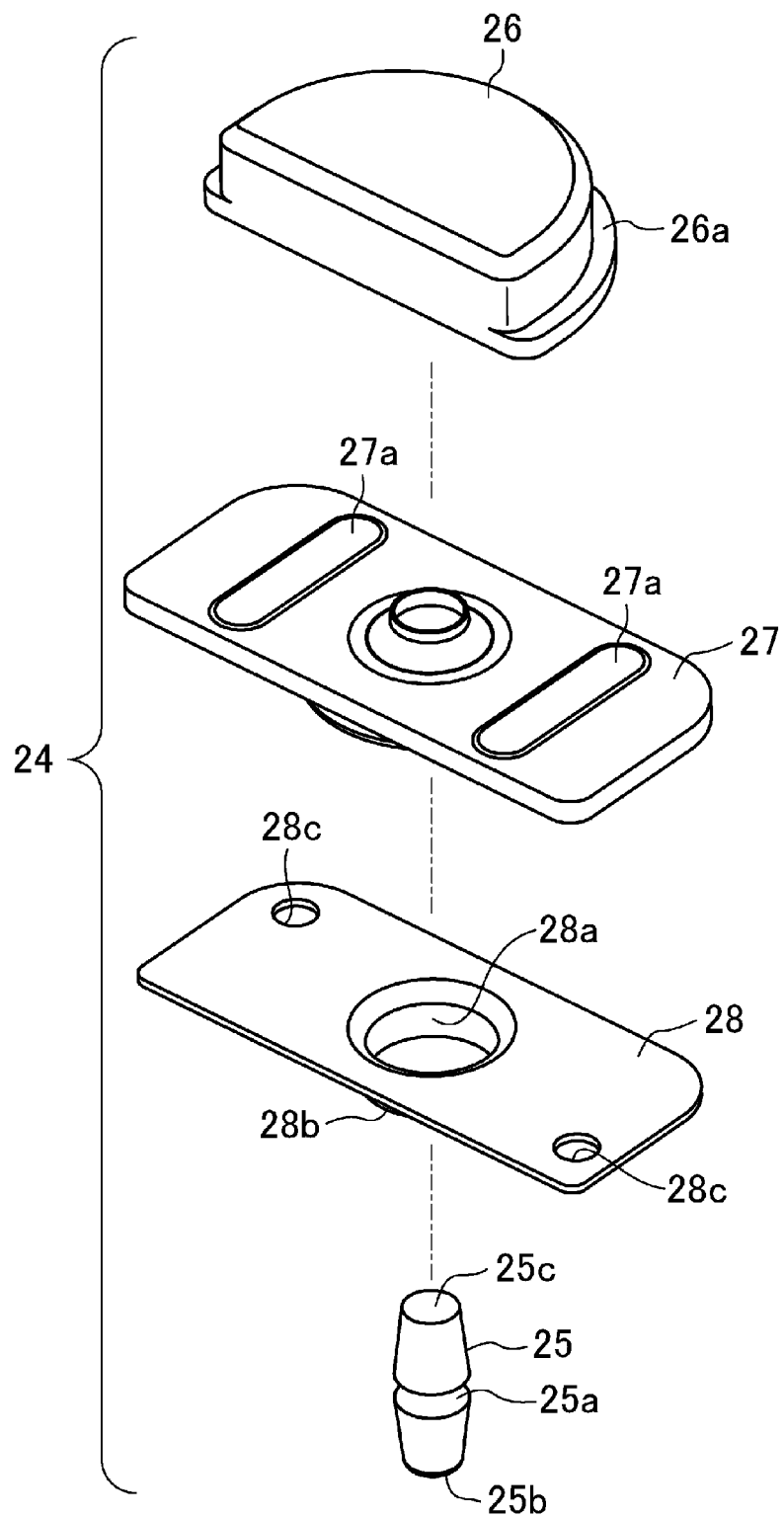
FIG. 9 is an enlarged exploded perspective view of the switch assembly.

The reinforcing plate 28 has a plate through hole 28a in its center in order to allow the pressing element 25 to be inserted therethrough. The reinforcing plate 28 has an annular vertical wall portion 28b formed in the periphery of the plate through hole 28a by bending a part of the reinforcing plate 28 to the side of the press switch 21. The dimensions of the pressing element 25 and the reinforcing plate 28 are designed so that there is a predetermined gap between the inner periphery of the vertical wall portion 28b and the outer periphery of the pressing element 25. As shown in FIG. 9, the reinforcing plate 28 has positioning holes 28c configured to position the reinforcing plate 28 when molding the reinforcing plate 28 integrally with the silicone rubber 27. The reinforcing plate 28 is formed by, e.g., pressing a stainless steel alloy. The side of the pressing element 25, which faces the press switch 21, is not covered by the silicone rubber 27, so that the pressing element 25 directly presses the press switch 21. The silicone rubber 27 has a pair of protruding portions 27a on its surface located on the side of the key top 26, so that the rear surface of the key top 26 contacts the protruding portions 27a when the key top 26 is pressed hard.

On the other hand, as shown in FIGS. 4-6, an elastic-member fitting recess 23b is formed in the bottom surface 23a of the switch recess 23 so as to surround the switch through hole 22. The elastic-member fitting recess 23b is a groove having an annular shape as viewed from the side surface of the lower housing 5. Similarly, an elastic-member annular recess 27b is formed in the silicone rubber 27 at a position corresponding to the elastic-member fitting recess 23b, so as to cover an inner peripheral wall surface 23c of the elastic-member fitting recess 23b and an inner peripheral wall surface 22a of the switch through hole 22. When the switch assembly 24 is fitted in the switch recess 23, the elastic-member annular recess 27b of the silicone rubber 28 integrally formed on the back side of the reinforcing plate 28 is pressed against the inner peripheral wall surface 23c of the elastic-member fitting recess 23b and the inner peripheral wall surface 22a of the switch through hole 22 by a corner portion 28d formed by the vertical wall portion 28b and the periphery of the plate through hole 28a of the reinforcing plate 28, whereby dustproof and waterproof effects are produced. A latch recess 22b is formed on the side of the press switch 21 in the inner peripheral wall surface 22a of the switch through hole 22 so as to be recessed with respect to the side of the key top 26. For example, as the latch recess 22b, a part of the inner peripheral wall surface 22a, which is located on the side of the press switch 21, is recessed along the entire circumference with respect to a part of the inner peripheral wall surface 22a, which is located on the side of the key top 26, so that the former part has a larger inner diameter than the latter part. Thus, a back hook portion 27d of the silicone rubber 27 pushed into the switch through hole 22 by the vertical wall portion 28b is latched by the latch recess 22b. The latch recess 22b thus provides the effect of preventing the back hook portion 27d of the silicone rubber 27 from being removed therefrom. The latch recess 22b need not necessarily be a continuous recess, and recesses may be discretely formed.

Manufacturing Method of Switch Assembly

Figure 1:
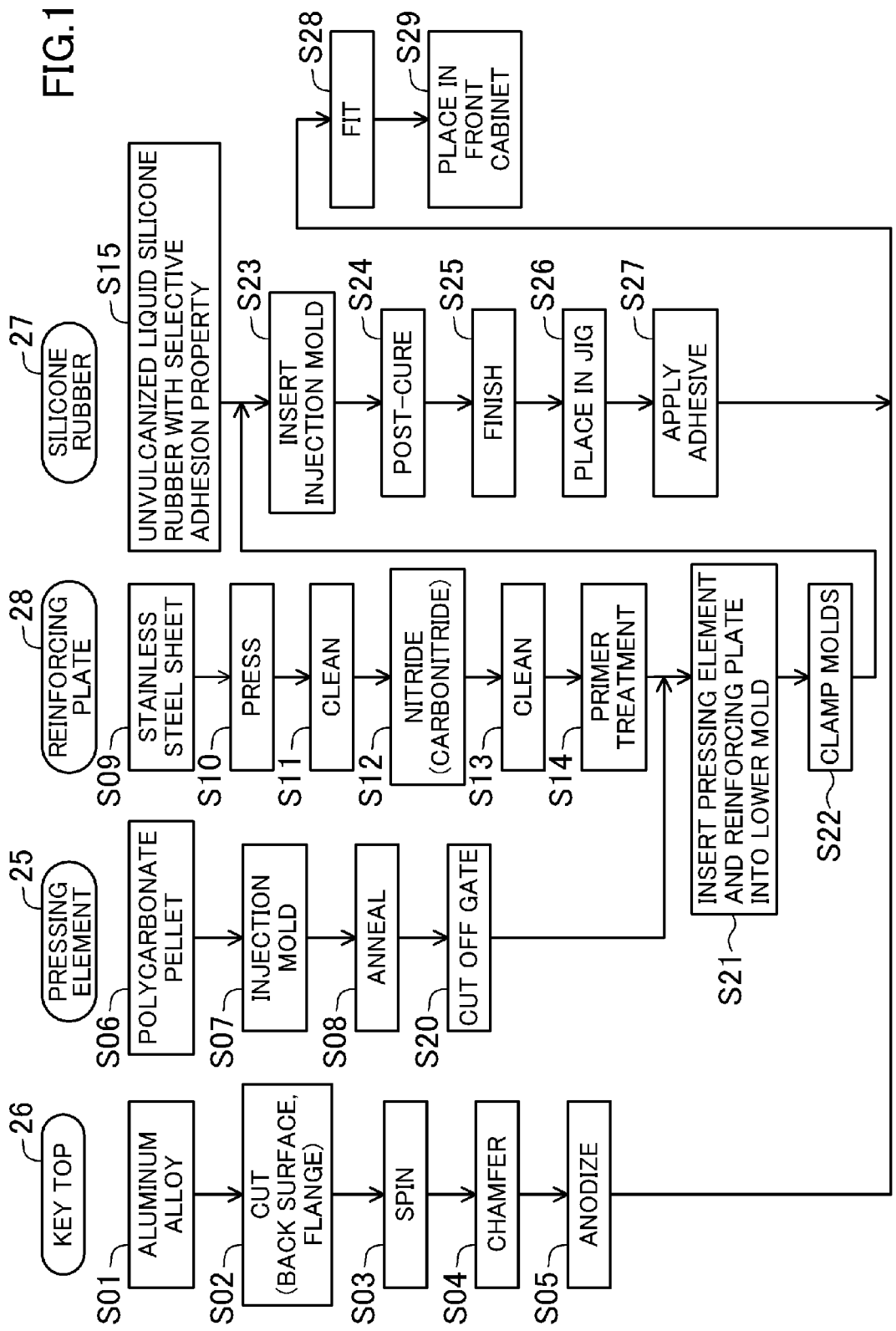
FIG. 1 is a flow chart showing a manufacturing method of a push-button switch according to an embodiment.

An example of a manufacturing method of the switch assembly 24 according to the present embodiment will be described in detail below with reference to FIG. 1.

First, a preparation step will be described.

Production of the key top 26 will first be described. A block of an aluminum alloy is prepared in step S01.

Then, in step S02, the block of the aluminum alloy is processed to form the flange 26a, the pressing-element fitting recess 26b, and the back surface, etc. The pressing-element fitting recess 26b is formed by cutting the block of the aluminum alloy so that the inner diameter of the pressing-element fitting recess 26b is gradually reduced toward the bottom surface of the pressing-element fitting recess 26b according to the shape of the pressing element 25. This prevents looseness or tilting of the key top 26 when the key-top end 25c is inserted in the pressing-element fitting recess 26b.

Thereafter, in step S03, a spin process is performed in order to improve the appearance of the surface of the key top 26.

Subsequently, in step S04, the corner of the surface of the key top 26 is chamfered in order to improve the texture and for safety reasons.

Then, in step S05, the surface of the key top 26 is anodized to improve durability, whereby the key top 26 is completed.

Molding of the pressing element 25 will be described below. First, a pellet of a general-purpose high flow polycarbonate material is prepared in step S06.

Figure 12:
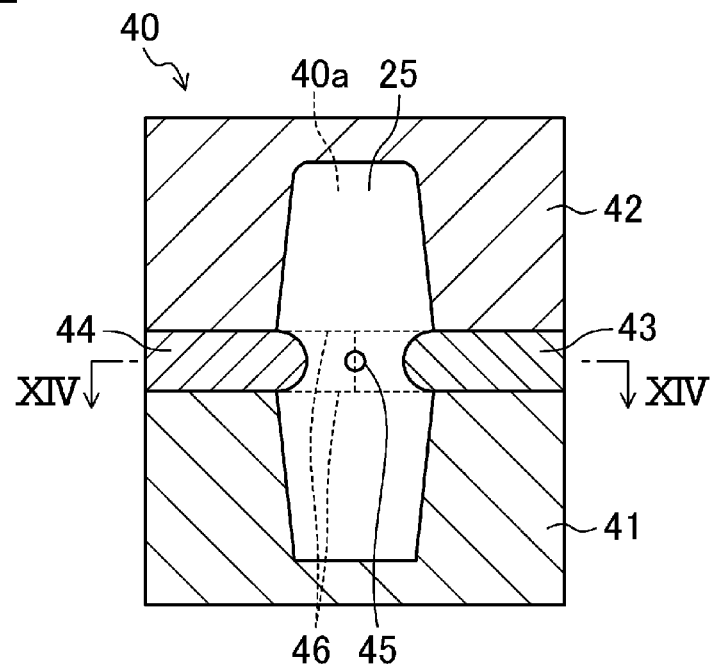
FIG. 12 is a cross-sectional view showing a state in which a mold for molding a pressing element is closed, as viewed from the side.
Figure 13:
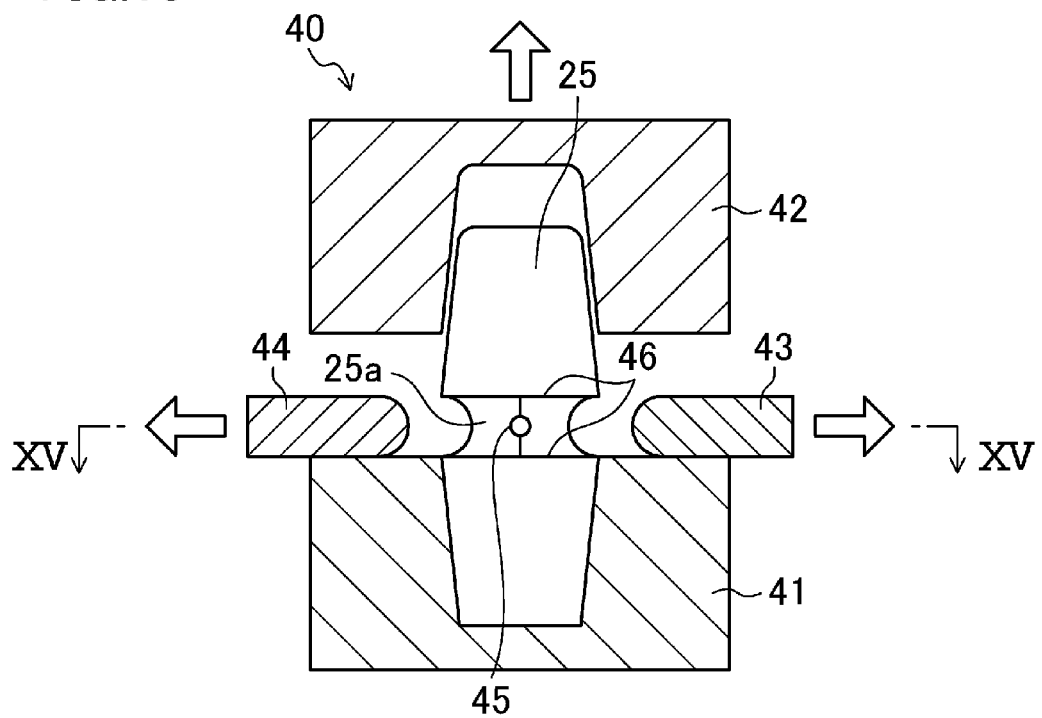
FIG. 13 is a cross-sectional view showing a state in which the mold for molding the pressing element is opened, as viewed from the side.
Figure 14:
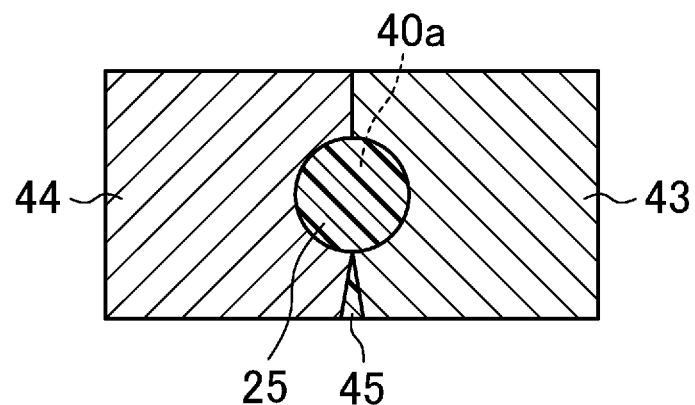
FIG. 14 is an enlarged cross-sectional view taken along line XIV-XIV in FIG. 12.
Figure 15:
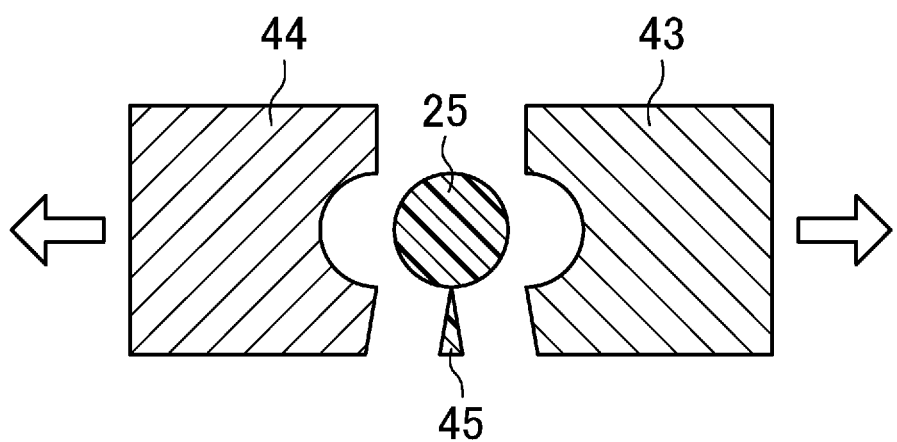
FIG. 15 is an enlarged cross-sectional view taken along line XV-XV in FIG. 13.

Next, in step S07, as shown in FIGS. 12 and 14, molten polycarbonate is injected into a cavity 40a of an injection molding mold 40 to mold the pressing element 25. In order to form the bonding recess 25a in the intermediate portion in the axial direction of the pressing element 25, a pair of slide cores 43, 44 are placed in a corresponding portion of the injection molding mold 40. A gate 45 is provided at the mating surface between the slide cores 43, 44. As shown in FIGS. 13 and 15, when the injection molding mold 40 is removed, the pressing element 25 has the gate 45 connected to the bonding recess 25a. Parting lines 46 (shown by broken lines in FIG. 12 and solid lines in FIG. 13) are formed by such a configuration of the injection molding mold 40. Since the gate 45 is connected to the bonding recess 25a, the small pressing element 25 can be easily handled in the subsequent steps.

Then, annealing is performed in step S08. For example, the pressing element 25 is placed in a dryer, not shown, at 120° C. or more for 30 minutes. It is desirable to perform a surface roughening treatment as appropriate on the bonding recess 25a and a portion around the bonding recess 25a to which the silicone rubber 27 is to adhere. This increases the adhesion area, and further improves adhesion of the silicone rubber 27. A primer treatment for improving adhesion of the silicone rubber 27 is not particularly required.

Molding of the reinforcing plate 28 will be described below. First, a stainless steel sheet of, e.g., SUS 304-1/2H is prepared in step S09. SUS 304-1/2H is desirable because of its high workability. The reinforcing plate may be comprised of a metal other than SUS 304-1/2H, and may be a resin molded product.

Next, in step S10, pressing is performed by using a press, not shown. During the pressing, the positioning holes 28c are formed at the positions shown in FIG. 9 etc., and the plate through hole 28a is formed in the center. The plate through hole 28a is bent to have an arc-shaped cross section and is pushed out to the side of the back surface, whereby the cylindrical vertical wall portion 28b is formed. The round corner portion 28d is formed between the vertical wall portion 28b and the back surface.

Then, the reinforcing plate 28 is cleaned in step S11 to remove impurities such as oil and chippings.

Thereafter, the surface of the reinforcing plate 28 is nitrided in step S12. For example, by a carbonitriding method, nitrogen, carbon, and oxygen elements are infiltrated into the surface of the reinforcing plate 28 at a low temperature equal to or lower than the transformation temperature of iron to form a stable homogenous nitride coating film. This layer is black, and thus the appearance is improved. This treatment increases the hardness of the reinforcing plate 28, and thus improves the durability thereof. This treatment also chemically stabilizes the reinforcing plate 28, and increases the corrosion resistance thereof.

Subsequently, the reinforcing plate 28 is cleaned in step S13 to remove impurities resulting from the nitriding treatment.

Then, a primer treatment is performed in step S14. This primer treatment is not necessarily required, but increases adhesion between the reinforcing plate 28 after the nitriding treatment and the silicone rubber 27. For example, a silane coupling agent, which serves to couple organic and inorganic materials, is used in the primer treatment.

Unvulcanized liquid silicone rubber 27 having a selective adhesion property is prepared in step S15. This silicone rubber 27 contains, e.g., a compound that does not adhere to a mold 30 containing chromium but adheres to polycarbonate.

Figure 10:
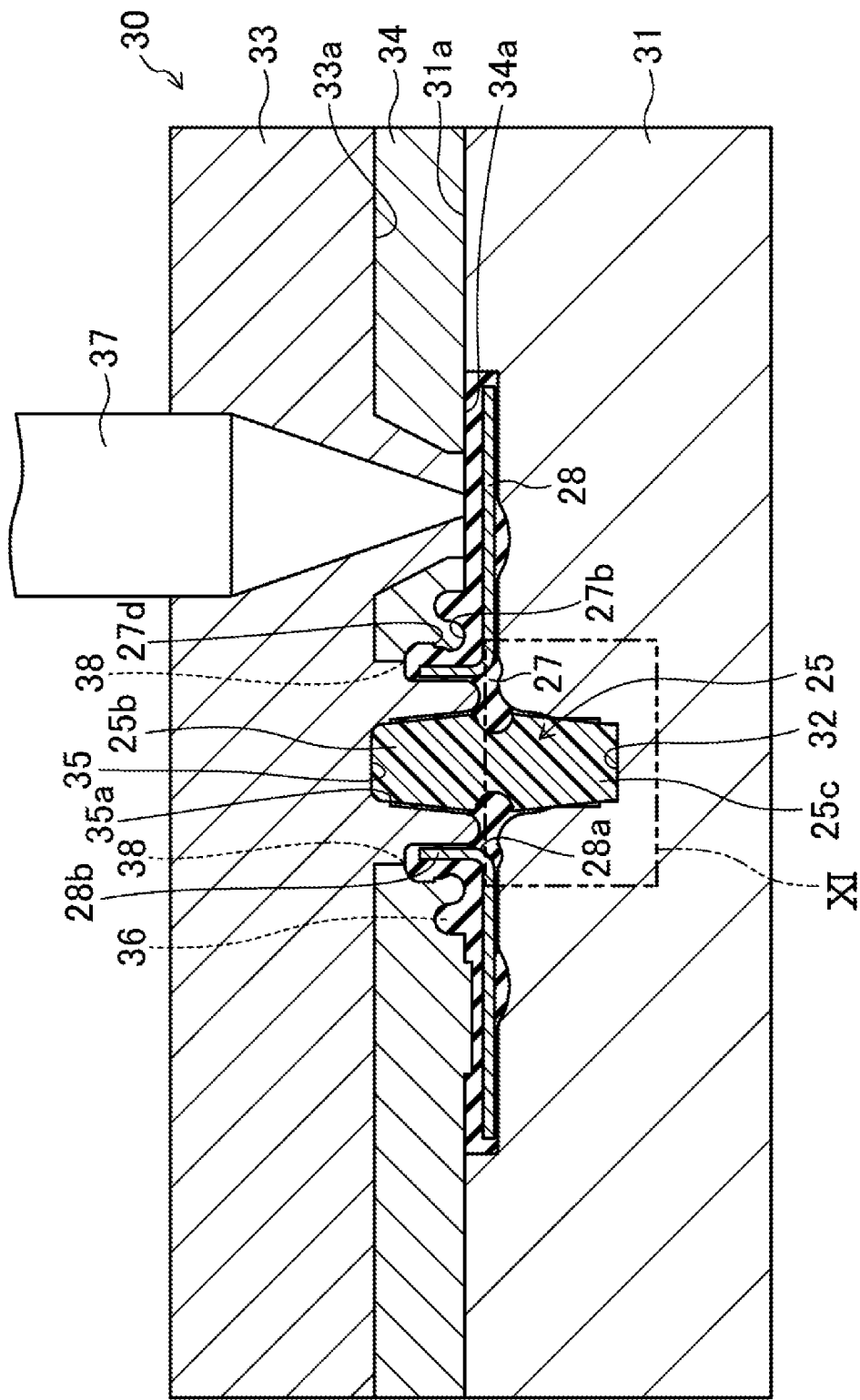
FIG. 10 is an enlarged cross-sectional view of a mold, showing injection molding.
Figure 11:
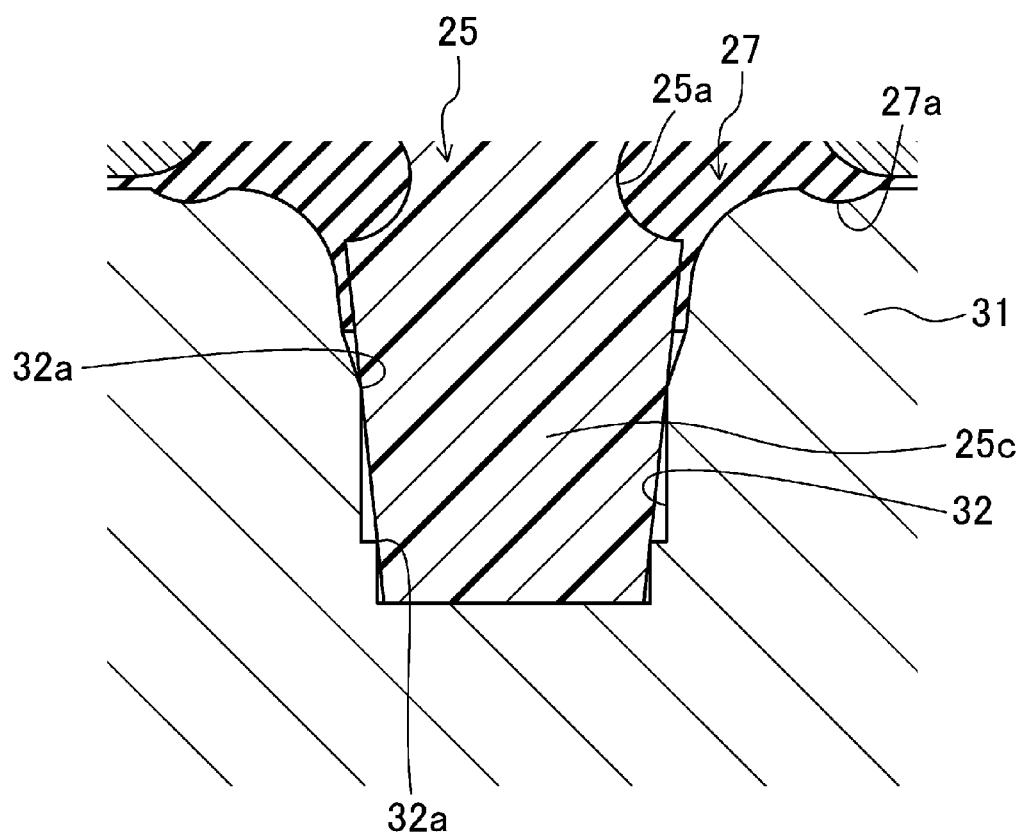
FIG. 11 is an enlarged cross-sectional view of a portion XI in FIG. 10.

Thereafter, the pressing element 25 and the reinforcing plate 28 thus formed are attached to a lower mold 31 shown in FIG. 10. Specifically, in a pressing-element insertion step in step S20, the key-top end 25c of the pressing element 25 is inserted into a lower-mold recess 32 for the pressing element 25, which is provided in a surface 31a of the lower mold 31. The gate 45 on the pressing element 25 is simultaneously cut off at this time. As shown in FIG. 11, the lower-mold recess 32 for the pressing element 25 has a circular cross section, and has stepped portions so that the inner diameter of the lower-mold recess 32 decreases stepwise at two or more positions. Since the outer periphery of the key-top end 25c is reliably retained by corners 32a (at two positions in the present embodiment) of the plurality of stepped portions, the pressing element 25 is not tilted in the lower mold 31.

Then, in a reinforcing-plate placing step in step S21, the reinforcing plate 28 is placed in the lower mold 31 so that the pressing element 25 extends through the plate through hole 28*a* of the reinforcing plate 28. At this time, since the positioning holes 28*c* are aligned with positioning pins, not shown, on the surface 31*a* of the lower mold 31, the reinforcing plate 28 is positioned in the horizontal direction so that a constant gap is present between the bonding recess 25*a* and the vertical wall portion 28*b*.

Then, in a mold clamping step in step S22, an intermediate plate 34 placed between an upper mold 33 and the lower mold 31 is moved down toward the lower mold 31. Since the back hook portion 27*d* has an undercut shape, the intermediate plate 34 is provided separately from the upper mold 33. The intermediate plate 34 is not required if there is no undercut portion. Although not appearing in FIG. 10, the reinforcing plate 28 is positioned in the vertical direction by at least a pair of retaining pins, which are provided on a lower surface 34*a* of the intermediate plate 34 to retain the reinforcing plate 28. Thus, a constant distance is maintained between the upper surface of the reinforcing plate 28 and the lower surface 34*a* of the intermediate plate 34. This allows the silicone rubber 27 to have a constant thickness. Marks 27*c* left by the retaining pins are recessed as shown in FIGS. 7B and 8B.

Thereafter, the upper mold 33 is closed. An upper-mold recess 35 for the pressing element 25, in which the pressing end 25*b* is inserted, is also formed in a lower surface 33*a* of the upper mold 33. Like the lower-mold recess 32, the upper-mold recess 35 for the pressing element 25 also has a circular cross section, and has a stepped portion so that the inner diameter of the upper-mold recess 35 decreases stepwise. When the upper mold 33 is closed, the outer periphery of the pressing end 25*b* contacts a corner 35*a* of the stepped portion where the inner diameter decreases stepwise. Since the pressing element 25 is not tilted due to the plurality of corners 32*a* of the lower mold 31, providing at least one corner 35*a* in the upper mold 33 prevents the silicone rubber 27 from flowing onto the tip end of the pressing end 25*b*. Alternatively, the tip end of the pressing end 25*b* may be covered in advance by heat-resistant rubber etc. so that the silicone rubber 27 does not flow onto the tip end of the pressing end 25*b*. Thus, the use of the intermediate plate 34 allows the parting line 38 to be formed along the boundary between the intermediate plate 34 and the upper plate 33 in the surface of the silicone rubber 27. Thus, no burr is formed in the elastic-member annular recess 27*b* that provides the dustproof and waterproof effects.

Subsequently, in an injection step (an introducing step) in step S23, the liquid silicone rubber 27 prepared in step S15 is injected through a gate portion 37 into a cavity 36 formed by the upper mold 33, the lower mold 31, and the intermediate plate 34. At this time, since the outer periphery of the key-top end 25*c* and the outer periphery of the pressing end 25*b* are reliably retained by the corners 32*a*, 35*a*, respectively, no silicone rubber 27 flows onto the outer periphery of the key-top end 25*c* and the outer periphery of the pressing end 25*b*, and no thin coating film is formed thereon. Thus, no unwanted burr is produced. Moreover, the pressing element 25 is accurately placed in the plate through hole 28*a* without being tilted.

Then, in a molding step, the mold 30 is pressed and held at a predetermined temperature for a predetermined time. For example, the mold 30 is heated to 120° C., and is pressed and held for 120 seconds. Since the temperature of the mold 30 is not high enough to melt the pressing element 25, the pressing element 25 is not thermally deformed. Moreover, since the pressing element 25 has been heat-treated at a temperature equal to or higher than that of the mold 30 in step S08, deformation is less likely to occur during the molding, and the dimensions after the molding are stabilized. The silicone rubber 27 is a material that is highly adhesive to polycarbonate, the silicone rubber 27 reliably chemically bonds with the pressing element 25.

Thereafter, a molded product, namely the pressing element 25 and the reinforcing plate 28 bonded together by the silicone rubber 27 injected into the cavity 36, is removed from the mold 30. Since the silicone rubber 27 is a material that adheres to polycarbonate but does not adhere to the mold 30, the molded product can be easily removed from the mold 30 without even breaking a thin portion of the molded product. Moreover, since the mold 30 is designed so that the parting line 38 is formed along the boundary between the intermediate plate 34 and the upper plate 33, the molded product can be easily removed from the mold 30 even if the molded product has an undercut portion such as the back hook portion 27*d*.

Subsequently, a post-curing treatment is performed in step S24. For example, the molded product is heated at 120° C. for 10 minutes to volatilize and remove low molecular siloxane remaining in the silicone rubber. The post-curing treatment also has the effect of stabilizing the material due to stress relief.

Then, deburring is performed in a finishing step in step S25. Since no burr is formed in the elastic-member annular recess 27*b* that provides the dustproof and waterproof effects, the deburring can be easily performed.

Thereafter, the molded product is placed in a jig, not shown, in a fitting step (an attaching step) in step S26.

Subsequently, in step S27, an adhesive is applied to the tip end of the key-top end 25*c* in the molded product. At this time, a double-sided tape may be applied thereto.

Then, in step S28, the pressing-element fitting recess 26*b* of the key top 26 is fitted on the key-top end 25*c*. Since there is no unwanted burr on the key-top end 25*c*, the key top 26 can be easily and reliably bonded to the pressing element 25 at this time.

The switch assembly 24 thus formed is fitted in the switch recess 23 of the front cabinet 5*a* in step S29, and is held by the rear cabinet 5*b*. Thus, the switch assembly 24 is assembled with the key top 26 exposed from the external fitting through hole 5*c*.

When the switch assembly 24 assembled in the lower housing 5 is operated, the pressing element 25 is depressed in the axial direction to press the press switch 21 with the silicone rubber 27 being bent. At this time, the axial direction of the pressing element 25 is reliably maintained perpendicularly to the reinforcing plate 28, and thus high usability of the switch assembly 24 is obtained. In addition, since the intermediate portion of the pressing element 25 is supported in the plate through hole 28*a* of the reinforcing plate 28 by the silicone rubber 27, the silicone rubber 27 is not compressed but is bent when the pressing element 25 is operated. Thus, the usability is less likely to be degraded even if the thickness of the silicone rubber 27 is increased. Accordingly, durability of the switch assembly 24 can be improved while ensuring the usability thereof. Moreover, since no burr is formed in the elastic-member annular recess 27*b*, very high dustproof and waterproof effects can be obtained.

Thus, according to the present embodiment, the pressing element 25 and the reinforcing plate 28 can be easily and reliably integrally molded, and the durability of the switch assembly 24 can be improved without degrading the usability thereof.

Other Embodiments

The above embodiment of the present invention may be configured as follows.

Specifically, although the elastic member is comprised of silicone rubber in the above embodiment, the elastic member is not limited to this, and may be comprised of an elastomer, a rubber, etc. capable of being injection molded. In this case as well, the pressing element 25 may contain a component that does not adhere to the mold 30 but adheres to the pressing element 25.

Although the pressing element 25 is comprised of polycarbonate in the above embodiment, the pressing element 25 may be comprised of other resin material. For example, the pressing element 25 may be comprised of polybutylene terephthalate (PBT), polyphenylene oxide (PPO), or polyamide (PA). In this case as well, regarding the combination with the elastic member, it is desirable that the elastic member be not capable of adhering to the mold 30 but be capable of adhering to the pressing element 25. Although the shape of the pressing element 25 is not limited to that shown in the above embodiment, it is desirable that the pressing element 25 is provided with the bonding recess 25a or a through hole at an intermediate position in the axial direction.

Although the reinforcing plate 28 is comprised of SUS 304 in the above embodiment, the reinforcing plate 28 may be comprised of other metal such as titanium, or may be comprised of a rigid resin material. Regarding the combination with the elastic member, it is desirable that the elastic member be not capable of adhering to the mold 30 but be capable of adhering to the reinforcing plate 28. Although the shape of the reinforcing plate 28 is not limited to that shown in the above embodiment, it is desirable in terms of the strength that the reinforcing plate 28 is shaped to cover at least the periphery of the switch through hole 22 from the side of the key top 26.

The above embodiment is configured so that the portion of the pressing element 25, which is located on the side of the press switch 21, is not covered by the silicone rubber 27, and the pressing element 25 directly presses the press switch 21. However, the portion of the pressing element 25, which is located on the side of the press switch 21, may be covered by the silicone rubber 27 so as to reduce the possibility of damage to the press switch 21. In this case, no corner 35a is provided in the upper-mold recess 35 for the pressing element 25 so as to allow the silicone rubber 27 to flow therein.

Although the key top 26 is comprised of an aluminum alloy in the above embodiment, the key top 26 may be comprised of a metal such as stainless steel, titanium, copper, or magnesium, or an alloy thereof. Alternatively, the key top 26 may be comprised of a thermoplastic resin such as polycarbonate, acrylic, polyamide, polyacetal, polyester, polystyrene, or acrylonitrile butadiene styrene (ABS), or a thermosetting resin such as phenol, epoxy, alkyd, urethane, polyimide, or silicone.

Although the pressing-element fitting recess 26b is provided in the back surface of the key top 26 in the above embodiment, the pressing-element fitting recess 26b need not necessarily be provided, and the back surface of the key top 26 may be flat. Alternatively, a protrusion may be provided on the back surface of the key top 26, and a recess may be provided in the pressing element 25.

Although the plate through hole 28a is provided in the center of the single reinforcing plate 28 in the above embodiment, two or more through holes may be provided in the single reinforcing plate, and the pressing element 25 may be placed in each through hole.

A plurality of pressing elements 25 may be provided by connecting two or more reinforcing plates 28 together by the elastic member in the molding step.

In the case where two or more pressing elements 25 are located close to each other, the key top 26 may be individually attached to each pressing element 25 of each press button, or the same number of key tops 26 as the pressing elements 25 may be connected together.

Although the above embodiment is described with respect to an example of injection molding in which the introducing step is the injection step of injecting a liquid elastic member, so-called transfer molding may be used. Although not shown in detail in the figures, in this case, a preheated clay-like (millable) elastic member is placed in a transfer pot, and is pressed by a plunger and transferred into the cavity 36 in the introducing step. Although compression molding may be used, the injection molding or the transfer molding is desirable in order to accurately fix the pressing element 25.

In the above embodiment, the upper mold 33 is structured to include the intermediate plate 34 in order to facilitate removal of the molded product from the mold 30 even if there is an undercut portion such as the back hook portion 27d. However, as shown in FIG. 16, in the case where there is no undercut portion such as the back hook portion 27d, an upper mold 133 can be used in which the upper mold 33 is integrated with the intermediate plate 34. In this case, the pair of retaining pins can be provided on a lower surface 133a of the upper mold 133.

In the above embodiment, the push-button switch is the switch assembly 24 that is used for the side key 20 of the mobile phone. However, applications of the push-button switch are not limited, and the push-button switch may be used in electronic devices such as a personal handy-phone system (PHS), a personal digital assistant (PDA), a personal computer, a mobile tool, an electronic dictionary, an electronic calculator, a game machine, and a watch. These electronic devices need not necessarily have a waterproof function, and according to the present invention, have high usability and a high dustproof function.

Note that the above embodiments are essentially preferable examples, and are not intended to limit the scope of the present invention, its applications, and its uses.

INDUSTRIAL APPLICABILITY

As described above, the present invention is useful for manufacturing methods of a push-button switch for use in electronic devices such as a mobile phone.

DESCRIPTION OF REFERENCE CHARACTERS

24 Switch Assembly (Push-Button Switch)
25 Pressing Element
25a Bonding Recess
25b Pressing End (the Other End)
25c Key-Top End (One End)
26 Key Top
27 Silicone Rubber (Elastic Member)
28 Reinforcing Plate
28a Plate Through Hole
31 Lower Mold
31a Surface of Lower Mold
32 Lower-Mold Recess for Pressing Element
32a Corner
33 Upper Mold
33a Lower Surface of Upper Mold
34 Intermediate Plate 34a Lower Surface
35 Upper-Mold Recess for Pressing Element
35a Corner
36 Cavity
133 Upper Mold
133a Lower Surface of Upper Mold

The invention claimed is:

1. A manufacturing method of a push-button switch, comprising:
- a preparation step of preparing a key top, a pressing element that is attached to a back surface of the key top, and a reinforcing plate having a plate through hole that is larger than an outer periphery of the pressing element;
- a pressing-element insertion step of inserting one end in an axial direction of the pressing element into a lower-mold recess for the pressing element, which is provided in a surface of a lower mold;
- a reinforcing plate placing step of placing the reinforcing plate in the lower mold so that the pressing element extends through the plate through hole of the reinforcing plate;
- a mold clamping step of moving an upper mold and the lower mold toward each other so as to insert the other end of the pressing element into an upper-mold recess for the pressing element, which is provided in a lower surface of the upper mold;
- an introducing step of introducing an elastic member, which contains a component that does not adhere to the upper and lower molds but adheres to the pressing element, into a cavity formed between the upper and lower molds;
- a molding step of, after the introducing step, pressing and holding the upper and lower molds at a predetermined temperature for a predetermined time, and then opening the upper and lower molds to remove a molded product in which an intermediate portion in the axial direction of the pressing element is supported in the plate through hole by the elastic member; and
- an attaching step of attaching the back surface of the key top to the one end of the pressing element in the molded product.

2. The manufacturing method of claim 1, wherein
the reinforcing plate is comprised of a metal, and has been subjected to a nitriding treatment.

3. The manufacturing method of claim 2, wherein
the reinforcing plate has been subjected to a primer treatment that increases adhesion between a surface of the reinforcing plate after the nitriding treatment and the elastic member.

4. The manufacturing method of claim 1, wherein
the pressing element is comprised of a thermoplastic resin, and
in the molding step, molding is performed at a temperature that is not high enough to melt the pressing element.

5. The manufacturing method of claim 4, wherein
the pressing element is comprised of polycarbonate, and
the elastic member is comprised of silicone rubber that chemically bonds with the polycarbonate in the molding step.

6. The manufacturing method of claim 1, wherein
the one end and the other end of the pressing element have a circular cross section, and are tapered so that an outer diameter of each of the ends is gradually reduced toward outside,
at least one of the lower-mold recess for the pressing element and the upper-mold recess for the pressing element has a circular cross section, and is recessed so that its inner diameter decreases stepwise at two or more positions, and
the outer periphery of the pressing element contacts each of a plurality of corners where the inner diameter decreases stepwise, and prevents the elastic member from flowing onto the outer periphery of the pressing element.

7. The manufacturing method of claim 1, wherein
a surface roughening treatment is performed before the molding step on a portion of the pressing element, to which the elastic member is to adhere.

8. The manufacturing method of claim 1, wherein
the pressing element is heat-treated before the molding step at a temperature equal to or higher than the predetermined temperature of the molding step.

9. The manufacturing method of claim 1, wherein
a constant distance is maintained between an upper surface of the reinforcing plate and the lower surface of the upper mold by at least a pair of retaining pins, which are provided on the lower surface of the upper mold to retain the reinforcing plate.

* * * * *